UNITED STATES PATENT OFFICE.

GUSTAV ERNST POSSE, OF NEWARK, NEW JERSEY, ASSIGNOR TO THE JAENECKE PRINTING INK CO., OF NEWARK, NEW JERSEY.

PRINTING-INK.

1,142,365. Specification of Letters Patent. Patented June 8, 1915.

No Drawing. Application filed December 17, 1913. Serial No. 807,357.

*To all whom it may concern:*

Be it known that I, GUSTAV ERNST POSSE, a citizen of the United States, residing at Newark, in the county of Essex and State of New Jersey, have invented certain new and useful Improvements in Printing-Inks, of which the following is a specification.

This invention relates to new and useful improvements in printing inks, and more particularly to the method of compounding same.

The primary object of the present invention is to produce a suitable printing ink, especially adapted for printing with engraved surfaces.

A further object of the present invention is to provide a thoroughly reliable printing ink, especially adapted for printing with engraved surfaces in connection with cylinder or rotary presses.

Still another object of the present invention is to produce a suitable vehicle for such a printing ink, allowing that the vehicle or the ink may be thinned as needed.

A still further object of the present invention is to produce a vehicle or a printing ink where no evaporating of ethereal oils, which are inflammable and dangerous to health and property, will occur.

Another object of the present invention is to produce a printing ink being uniform in color which will give a clear and distinct imprint from engraved surfaces in connection with rotary or cylinder presses, and which is easily removable from the surfaces.

It has been practised to manufacture a printing ink for use on engraved surfaces in connection with a rotary or cylinder press, but satisfactory results have so far not been obtained. The printing inks known for this purpose are not adaptable. In order to obtain a comparatively great fluidity, which is absolutely necessary, the printing inks are mixed with a thinner, the latter is volatile, which will effect the uniformity of the color. Moreover the odor of the evaporating thinner is objectionable and the vapor is injurious to health and dangerous, owing to its inflammability. In addition to those objectionable qualities, it is difficult to remove the ink satisfactorily by the known mechanical means, such as what is termed a doctor of a rotary or cylinder press. According to more or less pressure of the doctor and evaporating of the thinner the ink will become smeary, the imprint may faint or will be indistinct. This printing ink as described in this specification overcomes all those objections, produces an ink guaranteeing a uniformity of the color, etc., retaining water and ethereal oils. The above referred doctor takes off easily all surplus ink from the non-etched parts of the engravings used.

A mixture of the ingredients as hereafter described, will result in a homogeneous composition, which will retain water and ethereal oils and by adding one or the other of the last mentioned may be thinned to a desired consistency. The mixture may then be compounded with lake colors, carbon black, mineral or anilin dyestuffs, dry or in paste form.

The finished product will be a printing ink having a great fluidity and features, etc., as pointed out in the foregoing specification.

Having pointed out the purpose of this invention, I will now describe the process of manufacturing my improved printing ink.

In carrying out my invention, I use the following products, namely, casein or albumin (albumen), alkali salts and sulfonated oils or salts thereof.

The formula of the vehicle is: casein or albumin (albumen), 10; borax or its equivalent, 1.25; Turkey red oil, 20; water, 35; turpentine, 10.

The formula for the printing ink is: vehicle, either prepared with casein or albumin (albumen), 11; anilin dyestuff in paste form or its equivalent, 5.4; carbon black, 2.2; water, 8.8; turpentine, 2.

It is of course understood that I do not limit myself as to the respective amount of each ingredient stated, this is merely the preferred composition of the different materials; but I may change the quantity without departing from the scope of my invention.

Having described my invention, what I claim as new and desire to secure by Letters Patent is:

A printing ink adapted for intaglio or photogravure processes on cylinder or rotary presses consisting of a mixture of a vehicle of casein, alkali salts, sulfonated oils with lake colors, carbon black, mineral dye stuffs and ethereal oils and water used in substantially the proportions described.

In testimony whereof I affix my signature in presence of two witnesses.

GUSTAV ERNST POSSE.

Witnesses:
E. A. KERN,
HENRY KRAUSS.